(12) United States Patent
Mayer-Ullmann

(10) Patent No.: US 8,418,070 B2
(45) Date of Patent: Apr. 9, 2013

(54) DEVELOPING USER INTERFACE ELEMENT SETTINGS

(75) Inventor: Dietrich Mayer-Ullmann, Ilvesheim (DE)

(73) Assignee: SAP AG, Walldorf (DE)

( * ) Notice: Subject to any disclaimer, the term of this patent is extended or adjusted under 35 U.S.C. 154(b) by 943 days.

(21) Appl. No.: 12/247,498

(22) Filed: Oct. 8, 2008

(65) Prior Publication Data

US 2010/0088618 A1 Apr. 8, 2010

(51) Int. Cl.
*G06F 3/48* (2006.01)

(52) U.S. Cl.
USPC ........... 715/763; 715/762; 715/765; 715/235; 715/236; 717/106; 717/109

(58) Field of Classification Search .................. 715/763
See application file for complete search history.

(56) References Cited

U.S. PATENT DOCUMENTS

| | | | | |
|---|---|---|---|---|
| 6,330,007 B1 * | 12/2001 | Isreal et al. | ................ | 715/762 |
| 6,925,604 B1 * | 8/2005 | Bronnenberg | ................ | 715/745 |
| 6,973,626 B1 * | 12/2005 | Lahti et al. | ................ | 715/763 |
| 7,017,123 B2 * | 3/2006 | Chickles et al. | ................ | 715/816 |
| 7,337,393 B2 * | 2/2008 | Chartier et al. | ................ | 715/235 |
| 7,451,403 B1 * | 11/2008 | Srinivasan et al. | ................ | 715/763 |
| 7,571,426 B2 * | 8/2009 | Carroll, Jr. | ................ | 717/109 |
| 7,577,907 B2 * | 8/2009 | Vishnia-Shabtai et al. | ... | 715/255 |
| 7,594,181 B2 * | 9/2009 | Rothwein et al. | ................ | 715/763 |
| 7,610,394 B2 * | 10/2009 | Katinsky et al. | ................ | 709/231 |
| 7,673,227 B2 * | 3/2010 | Kotler et al. | ................ | 715/212 |
| 7,708,196 B2 * | 5/2010 | Palmieri et al. | ................ | 235/380 |
| 7,747,941 B2 * | 6/2010 | Campbell et al. | ................ | 715/234 |
| 7,757,207 B2 * | 7/2010 | Yan et al. | ................ | 717/109 |
| 7,793,258 B2 * | 9/2010 | Sundararajan et al. | ........ | 717/109 |
| 7,814,411 B2 * | 10/2010 | Beiser et al. | ................ | 715/236 |
| 7,870,512 B2 * | 1/2011 | Misovski | ................ | 715/861 |
| 7,987,428 B2 * | 7/2011 | Handy et al. | ................ | 715/762 |
| 2002/0085020 A1 * | 7/2002 | Carroll, Jr. | ................ | 345/700 |
| 2003/0184585 A1 * | 10/2003 | Lin et al. | ................ | 345/763 |
| 2004/0187082 A1 * | 9/2004 | Hathaway | ................ | 715/531 |
| 2004/0239700 A1 * | 12/2004 | Baschy | ................ | 345/781 |
| 2005/0102632 A1 * | 5/2005 | Klinger et al. | ................ | 715/789 |
| 2006/0015847 A1 * | 1/2006 | Carroll | ................ | 717/109 |
| 2006/0106897 A1 * | 5/2006 | Sapozhnikov et al. | ........ | 707/204 |
| 2007/0006206 A1 * | 1/2007 | Dhanjal et al. | ................ | 717/168 |
| 2007/0055932 A1 * | 3/2007 | Glein et al. | ................ | 715/526 |
| 2007/0150805 A1 * | 6/2007 | Misovski | ................ | 715/518 |
| 2007/0283243 A1 * | 12/2007 | Beiser et al. | ................ | 715/513 |
| 2008/0235601 A1 * | 9/2008 | Fried et al. | ................ | 715/760 |
| 2009/0019383 A1 * | 1/2009 | Riley et al. | ................ | 715/764 |
| 2009/0031235 A1 * | 1/2009 | Martin et al. | ................ | 715/765 |
| 2010/0077325 A1 * | 3/2010 | Barnea et al. | ................ | 715/763 |
| 2010/0169357 A1 * | 7/2010 | Ingrassia et al. | ................ | 707/769 |
| 2011/0078103 A1 * | 3/2011 | Teng et al. | ................ | 706/47 |

* cited by examiner

*Primary Examiner* — William Bashore
*Assistant Examiner* — Reza Nabi
(74) *Attorney, Agent, or Firm* — Brake Hughes Bellermann LLP

(57) ABSTRACT

Various example embodiments are disclosed. According to an example embodiment, a computer-implemented method may include receiving user interface guidelines via an editor graphical user interface, generating extensible-markup language (XML) guideline data based on the received user interface guidelines, presenting a prototyping graphical user interface with user interface element options based on the XML guideline data, receiving prototype user interface element settings via the prototyping graphical user interface, and generating XML prototype data based on the prototype user interface element settings.

22 Claims, 11 Drawing Sheets

```
C:\DOCUMENTS AND SETTINGS\D034822\DESKTOP\GUIDELINEPROTOTYPING.XML- MICROSOFT INTERNET EXPLORER
FILE  EDIT  VIEW  FAVORITES  TOOLS  HELP
ADDRESS    LINKS

<?xml version="1.0" encoding="utf-8" standalone="yes" ?>
- <BaseTable xmlns:xsi="http://www.w3.org/2001/XMLSchema-instance" XPosition="0" YPosition="0">
    <Properties>XYZ</Properties>
  - <Header XPosition="1" YPosition="1">
      <Properties>XYZ</Properties>
    +<Branding XPosition=" " YPosition=" " />
    +<Links XPosition=" " YPosition=" ">
  </Header>
  +<Toolbar XPosition="30" YPosition="1">
  +<LeftNavBar XPosition="60" YPosition="1">
  - <WorkArea XPosition="60" YPosition="100">
      <Properties>// Work Area</Properties>
    - <Titlebar XPosition="61" YPosition="120">
        <Properties>B2B: Internet Sales: New</Properties></Titlebar>
    - <Toolbar XPosition="61" YPosition="140">
        <Element Name="Save" Alignment="left" Display="mandatory" Type="Icon; Text" />
        <Element Name="Divider" Alignment="left" Display="mandatory" Type="Icon" />
        <Element Name="Divider" Alignment="left" Display="mandatory" Type="Icon" />
        <Element Name="Cancel" Alignment="left" Display="mandatory" Type="Icon; Text" />
        <Element Name="Delete" Alignment="left" Display="optional" Type="Icon" />
        <Element Name="Copy" Alignment="left" Display="optional" Type="Icon" />
        <Element Name="Divider" Alignment="left" Display="mandatory" Type="Icon" />
        <Element Name="Application" Alignment="left" Display="optional" Type="optional" />
        <Element Name="Divider" Alignment="left" Display="mandatory" Type="Icon" />
        <Element Name="More" Alignment="left" Display="optional; dynamically = 5" Type="text" />
        <Element Name="Personalization" Alignment="right" Display="mandatory" Type="Icon" />
        <Element Name="Print" Alignment="right" Display="mandatory" Type="Icon" />
        <Element Name="Help" Alignment="right" Display="mandatory" Type="Icon" />
        <Element Name="New" Alignment="left" Display="mandatory" Type="Icon; Text" /></Toolbar>
    +<AssignmentBlock XPosition="61" YPosition="160">
    +<AssignmentBlock XPosition="61" YPosition="260">
    +<AssignmentBlock XPosition="61" YPosition="260">
    +<AssignmentBlock XPosition="61" YPosition="260">
    +<AssignmentBlock XPosition="61" YPosition="260">
    +<AssignmentBlock XPosition="61" YPosition="260">
    +<NewElement XPosition="61" YPosition="">
  </WorkArea></BaseTable>
```

FIG. 4

DEVELOPING USER INTERFACE ELEMENT SETTINGS

TECHNICAL FIELD

This description relates to computer software.

BACKGROUND

Software programs may cause a graphical user interface to be displayed to a user. The software programs may include user interface element settings, which determine what user interface elements are shown to the user, and where they are shown. Inconsistencies in the user interface element settings may cause confusion or frustration on the part of the user.

SUMMARY

According to one general aspect, a computer-implemented method may include receiving user interface guidelines via an editor graphical user interface, generating extensible-markup language (XML) guideline data based on the received user interface guidelines, presenting a prototyping graphical user interface with user interface element options based on the XML guideline data, receiving prototype user interface element settings via the prototyping graphical user interface, and generating XML prototype data based on the prototype user interface element settings.

According to another general aspect, a computer program product for generating a user interface may be tangibly embodied on a computer storage medium. The computer program product may include executable code that, when executed, is configured to cause a computer to receive guideline user interface element settings via an editor graphical user interface, generate extensible-markup language (XML) guideline data based on the guideline user interface element settings, present a prototyping graphical user interface with user interface element options based on the XML guideline data, receive prototype user interface element settings via the prototyping graphical user interface, and generate XML prototype data based on the prototype user interface element settings.

The details of one or more implementations are set forth in the accompanying drawings and the description below. Other features will be apparent from the description and drawings, and from the claims.

BRIEF DESCRIPTION OF THE DRAWINGS

FIG. 4 shows extensible markup language (XML) data generated based on the guideline user interface element settings inputted into the editor graphical user interface shown in FIG. 3 according to an example embodiment.

DETAILED DESCRIPTION

Figure 1:
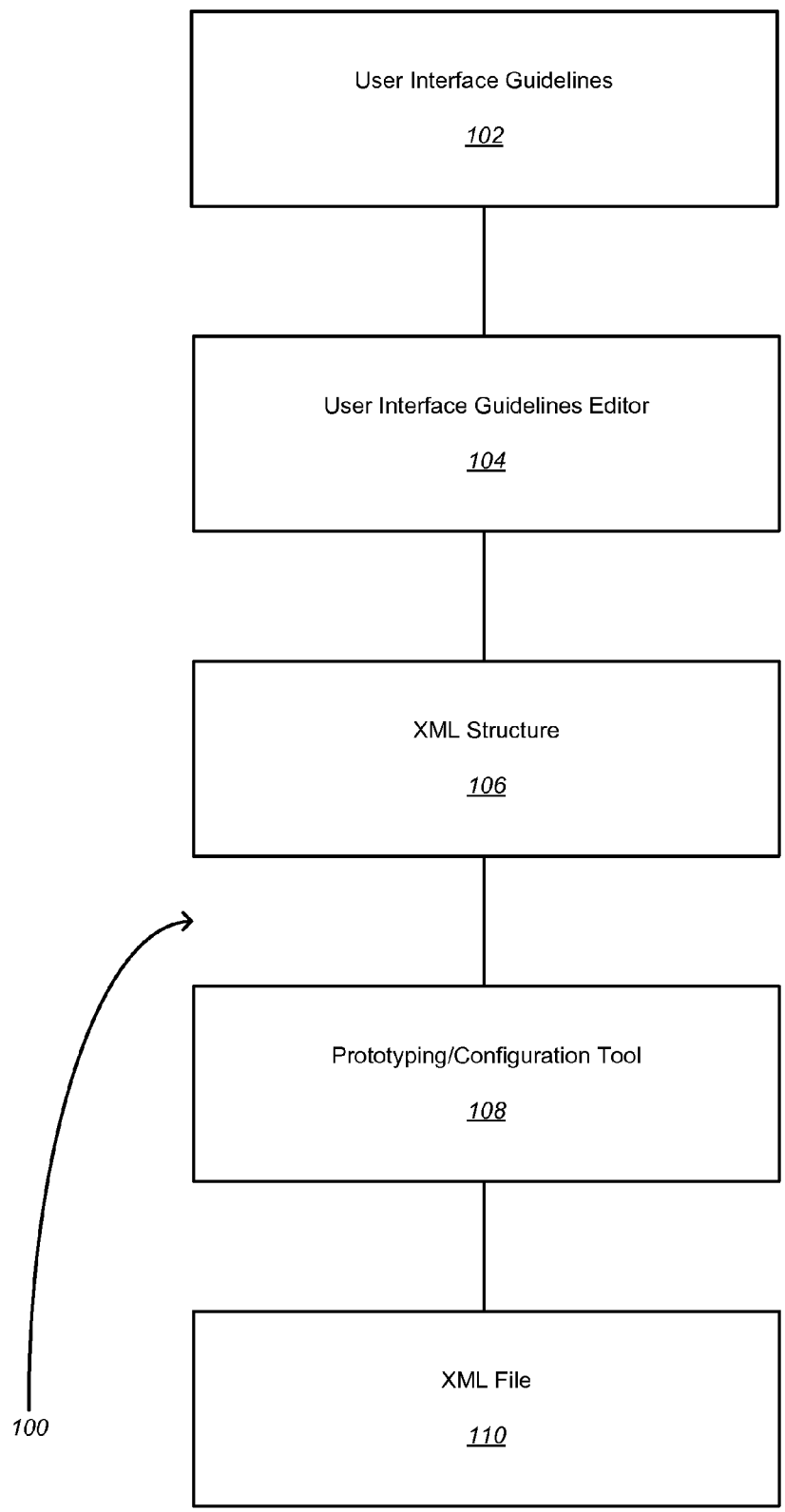
FIG. 1 is a block diagram showing a design path for development of user interface elements according to an example embodiment.

FIG. 1 is a block diagram showing a design path 100 for development of user interface elements according to an example embodiment. In an example embodiment, the design path 100 may include developing user interface guidelines 102. The user interface guidelines 102 may include rules for user interface elements for software applications. The software applications may, for example, be remotely accessed by a user via a network such as the Internet using a web browser.

The user interface guidelines 102 may include rules for placement and/or inclusion of user interface elements on a screen or user interface of the software applications. The user interface guidelines 102 may, for example, include rules regarding which buttons may be included in the software applications and/or in certain pages of the software applications, which fields or tables may be included, and rules for the arrangement of user interface elements on the screen. The user interface guidelines 102 may be compiled in print or electronic media, accessible for review and/or modifications by solution managers responsible for the developing and implementing the user interface element settings. User interface element settings based on the user interface guidelines 102 may be independent of the functionalities or processes undertaken by the software applications; a developer may, for example, write or modify code for the software applications without modifying the user interface element settings by operating on the assumption that certain inputs will be available based on the user interface element settings.

Figure 2A:
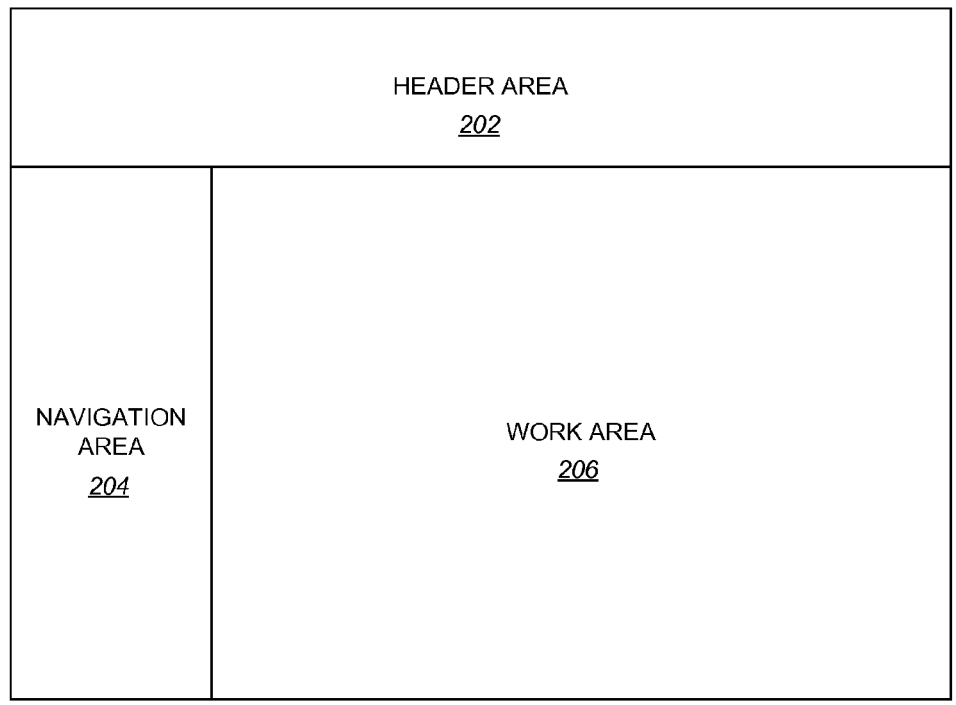
FIG. 2A is a block diagram showing screen areas according to an example embodiment.

The user interface guidelines 102 may, for example, define screen areas for the user interface. FIG. 2A is a block diagram showing screen areas 202, 204, 206 of a screen 200 according to an example embodiment. In this example, the user interface guidelines 102 may define a header area 202, a navigation area 204, and a work area 206. In this example, the user interface guidelines 102 may require the header area 202 to be at the top of the screen 200, the navigation area 204 to be on the left-hand side of the screen 200, and the work area 206 to occupy the remaining portion of the screen 200.

Figure 2B:
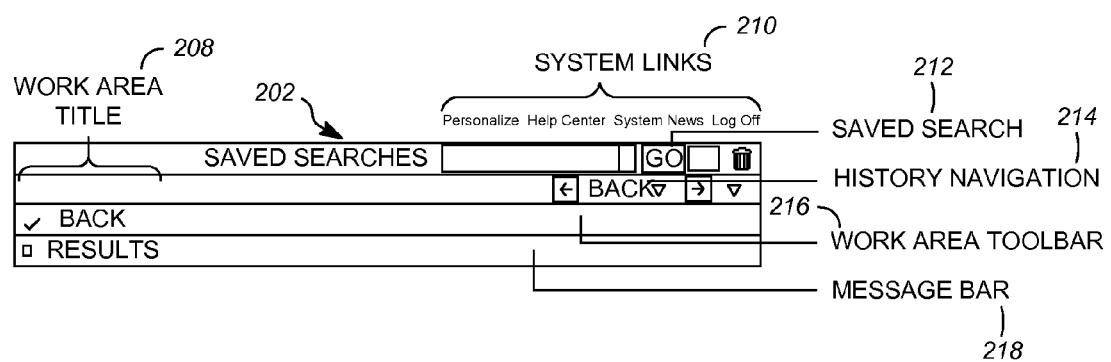
FIG. 2B is a screen shot showing a header area according to an example embodiment.

FIG. 2B is a screen shot showing the header area 202 according to an example embodiment. The user interface guidelines 102 may prescribe functional areas for use within the header area 202. In this example, the header area 202 may include a work area title 208. The work area title 208 may denote the content of the work area 206, such as "Marketing,"

"Search," "Account," "Service Order," or "Accessory," as non-limiting examples. A system links area 210 may include links to aid the user in utilizing the software application, such as "Personalize," "Help Center," "System News," and "Log Off," as non-limiting examples. A saved search area 212 may provide direct access to a list of predefined search queries. A history navigation area 214 may indicate recently visited pages, such as via a history dropdown list. A work area toolbar area 216 may include function buttons (not shown in FIG. 2B) related to the page displayed in the work area 206, such as, for example, "Back," "Save," "Cancel," "New," "Add," "Insert," "Delete," "Details," "Copy," "Edit," "Edit List," "More," "Export to Excel," "Personalize," "Print," "Help," "Back to Top," "Application-specific," "Move to Right," "Move to Left," "Expand Hierarchy," "Collapse Hierarchy," "Copy Line," and, "Remove Line," as non-limiting examples. A message bar area 218 may provide information to the user, such as information concerning errors, warnings, alerts, success, or general system events, as non-limiting examples. The user interface guidelines 102 may prescribe other functional areas in other example embodiments.

Figure 2C:
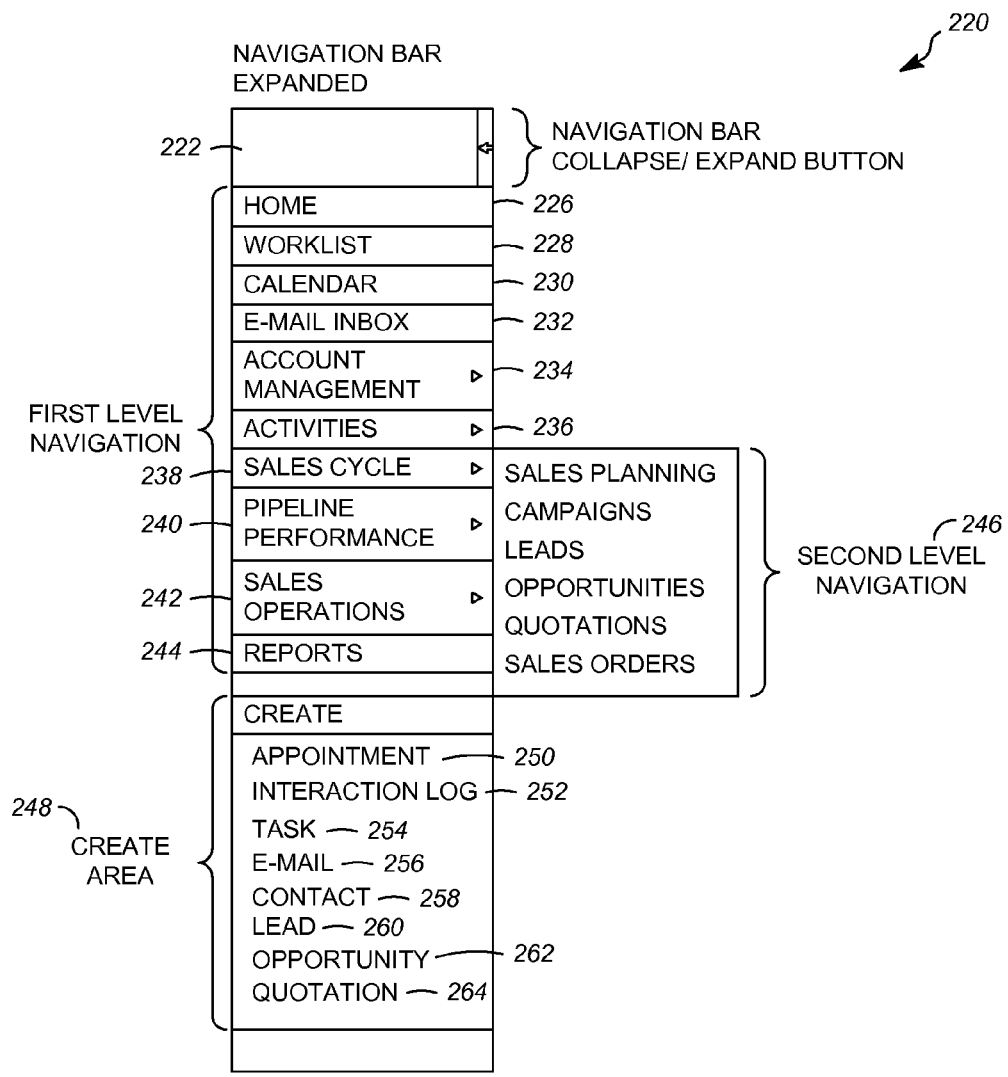
FIG. 2C is a screenshot showing an expanded navigation bar according to an example embodiment.
Figure 2D:
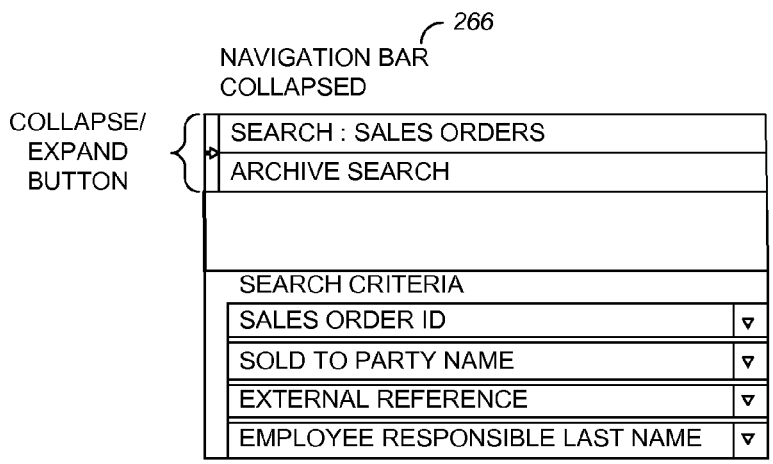
FIG. 2D is a screenshot showing a collapsed navigation bar according to an example embodiment.

FIG. 2C is a screenshot showing an expanded navigation bar 220 according to an example embodiment. The expanded navigation bar 220 may be included in the navigation area 204. The navigation area 204 may, for example, include a collapse/expand button 222, which, when clicked, may cause the navigation bar to expand, as shown in FIG. 2C, or collapse, as shown in FIG. 2D.

In an example embodiment, the user interface guidelines 102 may allow the expanded navigation bar 220 to include a plurality, such as two, navigation levels. A first navigation level 224 may have a plurality of first level navigation entries 226, 228, 230, 232, 234, 236, 238, 240, 242, 244. The user interface guidelines 102 may prescribe one or more of the first level navigation entries 226, 228, 230, 232, 234, 236, 238, 240, 242, 244 as mandatory, may prescribe an order or sequence of one or more of the first level navigation entries 226, 228, 230, 232, 234, 236, 238, 240, 242, 244, and/or may prescribe a maximum number of first level navigation entries 226, 228, 230, 232, 234, 236, 238, 240, 242, 244. In the example shown in FIG. 2C, the entries Home 226, Worklist 228, Calendar 230, E-Mail Inbox 232, and Reports 244 may be mandatory, and may be required to be sequential. In the example shown in FIG. 2C, the entries Account Management 234, Activities 236, Sales Cycle 238, Pipeline Performance 240, and Sales Operations 242 may be included between E-Mail Inbox 232 and Reports 244.

A second navigation level 246 may correspond to each of one or more of the entries 226, 228, 230, 232, 234, 236, 238, 240, 242, 244. The second navigation level 246 may be opened by clicking on its corresponding entry 226, 228, 230, 232, 234, 236, 238, 240, 242, 244. The second navigation level 246 may be also be closed by clicking on its corresponding entry 226, 228, 230, 232, 234, 236, 238, 240, 242, 244. The second navigation level 246 may include links to other pages, such as search pages associated with the content of the work area 206.

The expanded navigation bar 220 may also include a create area 248. The create area 248 may include links to navigate the user to create pages, such as an Appointment link 250, an Interaction Log link 252, a Task link 254, an E-Mail link 256, a Contact link 258, a Lead link 260, an Opportunity link 262, and a Quotation link 264, as non-limiting examples.

FIG. 2D is a screenshot showing a collapsed navigation bar 266 according to an example embodiment. The collapsed navigation bar 266 may be expanded by the user clicking on the collapsed navigation bar 266, thereby making available the features described with reference to the expanded navigation bar 220 shown in FIG. 2C.

Returning to FIG. 2A, the work area 206 may include content, allowing the user to enter data and select and view reports. The content of the work area 206 may depend on the type of page being viewed.

Returning to FIG. 1, the user interface guidelines 102 may include rules which specify certain user interface elements as 'mandatory' or 'optional'. A 'mandatory' user interface element may include a user interface element, such as a button, which must be included within a specified page of a software application, whereas an 'optional' user interface element may include a user interface element which may or may not be included in a specified page, at the discretion of a solution manager. The rules may also specify the location, order, or number of certain user interface elements.

In an example embodiment, the user interface guidelines 102 may specify page types for a software application. The page types may include, for example, any or all of a home page, a work center page, a search page, an overview page, an edit page, an edit list page, a freestyle application page, a search help dialog box, a value help dialog box, and a personalization dialog box.

The home page may be a starting point for users. The home page may include personal information, such as appointments and open tasks. The home page may also provide access to tools which the user frequently uses, such as via links.

Applications may include a work center page for each work center. The work centers may correspond to types of analyses or operations which the user desires, such as sales cycles, pipeline performances, or sales operations. The work center page may include links to reports, the reports themselves, and tools for creating new reports.

The search page may provide search capabilities for a user. The overview page may provide interfaces for viewing and editing object-related information, such as information about products or competitors. The edit page may allow users to create or maintain content. The edit list page may allow users to perform list maintenance. The freestyle application page may display information for applications not included in the overview page. The search help dialog box may allow users to select objects to assign to an object being edited, and to apply filters. The value help dialog box may allow the user to assign content out of a limited number of records, such as country, language, or currency. The personalization dialog box may provide personalization options to the user.

In an example embodiment, a developer may input the user guidelines 102 into a user interface guidelines editor 104. The user interface guidelines editor 104, which may include an editor graphical user interface such as the example graphical user interface shown in FIG. 3, may receive the user guidelines 102 from the solution manager. The user interface guidelines editor 104 may allow the solution manager to develop user interface rules based on a limited set of choices, such as specified buttons, parameters for tables, or the organization of user interface elements within hierarchies.

Figure 3:
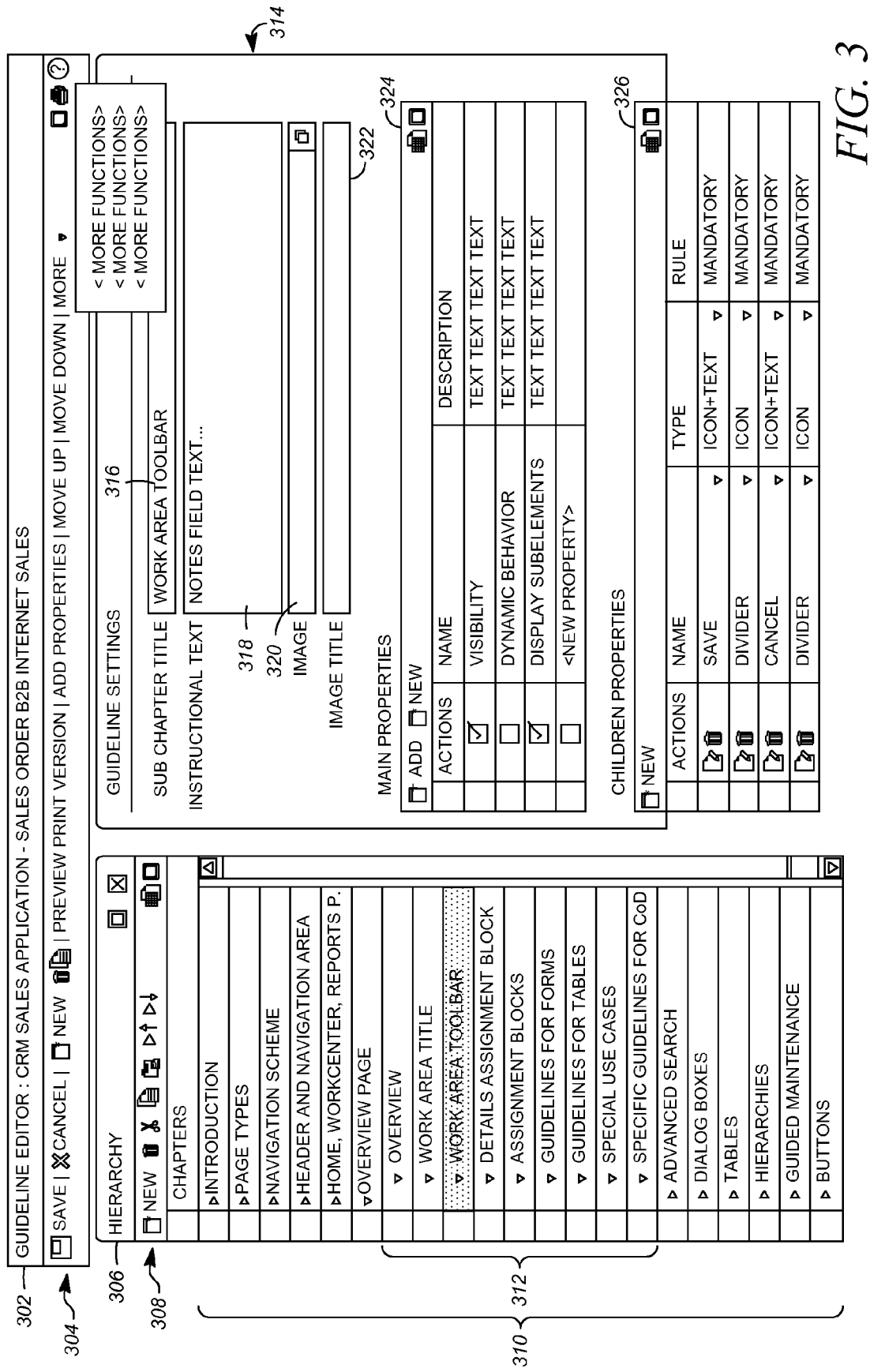
FIG. 3 is a screenshot of an editor graphical user interface for receiving guideline user interface element settings according to an example embodiment.

FIG. 3 is a screenshot of an editor graphical user interface 300 for receiving guideline user interface element settings according to an example embodiment. The user interface guidelines editor 104 may, for example, receive the user guidelines 102 described above via the example editor graphical user interface 300. In this example, the rules for screen areas 202, 204, 206 described above may be fixed, and the solution manager may create user interface element settings within the rules fixed for the screen areas.

The editor graphical user interface 300 may allow the solution manager to enter the title 302 of the file. In this example, the title 302 of the file, which may correspond to the software application for which the user interface guidelines 102 are being entered, is "CRM Sales Application—Sales Order B2B Internet Sales." The editor graphical user interface 300 may also allow a solution manager to add buttons 304 for managing the file, according to an example embodiment. The buttons 304 may, for example, be added via a drag-and-drop interface, or by right-clicking on a mouse to add or delete a button 304, in an example embodiment. The editor graphical user interface 300 may allow the solution manager to add or select properties of one or more of the buttons 304, such as 'mandatory' or 'optional', such as by presenting options in response to the solution manager right-clicking on the button 304, in an example embodiment. The editor graphical user interface 300 may also allow the solution manager to select a number of the buttons 304 which will be presented on the screen, and which may become available by clicking on a 'more' button, in an example embodiment. In another example embodiment, the editor graphical user interface 300 may allow the solution manager to set the rules for the buttons 304, as well as for a children properties table 326, described below.

In the example shown in FIG. 3, the editor graphical user interface 300 may include a hierarchy toolbar 306. The hierarchy toolbar 306 may allow the solution manager to select portions of the software application for which additional user interface guidelines 102 will be entered. The portions may be created one-by-one by the solution manager, may be modified based on templates, or may be populated by the user interface guidelines editor 104 based on receiving code for the software application, according to various example embodiments. The hierarchy toolbar 306 may, for example, include buttons 308 which allow the solution manager to create a new portion, delete a portion, cut, copy, paste, or move portions in the hierarchy toolbar 306.

The hierarchy toolbar 306 may also allow the solution manager to include a plurality of chapters 310. In an example embodiment, the editor graphical user interface 300 may allow the solution manager to create, delete, cut, copy, paste, or move chapters 310 by using the buttons 308. The chapters 310 may, for example, correspond to portions of the user interface and/or to user interface element settings. The editor graphical user interface 300 may also allow the solution manager to include subchapters 312 for any or all of the chapters 310. A group of subchapters 312 associated with a chapter 310 may be displayed when a chapter 310 is clicked on. The editor graphical user interface 300 may, for example allow the solution manager to create, delete, cut, copy, paste, or move subchapters 312 under a chapter 310 by using the buttons 308 after clicking on a chapter 310. The subchapters 312 may also correspond to portions of the user interface and/or to user interface element settings.

The editor graphical user interface 300 may also include a guideline settings workspace 314, which may present a graphical user interface for the solution manager to enter settings for each of the chapters 310 or subchapters 312. The editor graphical user interface 300 may include a title 316, which may correspond to the chapter 310 or subchapter 312 which has been highlighted. The editor graphical user interface 300 may include an instructional text field 318, which may allow the solution manager to enter notes for the chapter 310 or subchapter 312 which is being modified. The editor graphical user interface 300 may also include an image input 320, which may allow a solution manager to select an image file for display in the chapter 310 or subchapter 312; the image file may, for example, be selected via a file browser. The editor graphical user interface 300 may also include an image title field 322, which may allow the solution manager to input a title for the image file inputted in the image input 320, according to an example embodiment.

The editor graphical user interface 300 may also include a main properties table 324. The main properties table 324 may allow the solution manager to set rules for the appearance or display of a page (which may correspond to a chapter 310 or subchapter 312). The main properties table 324 may, for example, allow the solution manager to set rules for properties of the page, such as visibility, dynamic behavior, or display subelements.

The editor graphical user interface 300 may also include a children properties table 326. The children properties table 326 may allow the solution manager to set rules for the buttons in the header 202, such as mandatory and optional buttons, and dividers between the buttons. In the example shown in FIG. 3, the children properties table 326 has received instructions from the solution manager to include 'Save' and 'Cancel' buttons, as well as dividers, all of which are mandatory, rather than optional. The children properties table 326 has been instructed by the solution manager that the 'Save' and 'Cancel' buttons are of the type that include an icon and text, whereas the dividers are merely icons. Thus, in this example, the children properties table 326 may receive instructions from the solution manager to add buttons or dividers, to determine a type for the buttons or dividers, and to receive a rule from the solution manager to make the buttons or dividers either mandatory or optional.

Returning to FIG. 1, the user interface guidelines editor 104 may output an extensible markup language (XML) structure 106 based on the user input. While this example describes the user interface guidelines editor 104 generating an output in XML, the user interface guidelines editor 104 may generate the output in any other coding language which may be interpreted by a computer. The XML structure 106, or other coding structure, may include a representation of the user interface guidelines 102 in machine- or computer-readable form. The XML structure 106 may, for example, mandate locations of the screen areas 202, 204, 206, may indicate which buttons are mandatory and which buttons are optional, may indicate the required locations of the buttons, and may indicate rules for the buttons.

FIG. 4 shows extensible markup language (XML) guideline data 402 generated based on the guideline user interface element settings inputted into the editor graphical user interface 300 shown in FIG. 3 according to an example embodiment. In this example, the XML guideline data 402 show that the 'Save,' 'Cancel,' 'Personalization,' 'Print,' 'Help,' and 'New' buttons are mandatory, that the 'Delete,' 'Copy,' 'Application,' and 'More' buttons are optional, and that dividers are mandatory between the 'Save' and 'Cancel' buttons and between the 'Copy' and 'Application' buttons (or between the 'Cancel' and 'Divider' buttons if the 'Delete,' 'Copy,' and 'Application' buttons are not included). Thus, in this example, the XML guideline data 402 and a prototyping/configuration tool 108 (described below) will require the solution manager to include 'Save,' 'Cancel,' 'Personalization,' 'Print,' 'Help,' and 'New' buttons, and allow the solution manager to option to include 'Delete,' 'Copy,' 'Application,' and 'More' buttons. The XML guideline data 402 also show which buttons are only icons, and which buttons are icons and text. In this example, the "dynamically=5" associated with the 'More' button may cause the prototyping/configuration tool 108 to allow the solution manager to select up to five buttons to be displayed when a user clicks the 'More' button.

Returning to FIG. 1, the XML structure 106 (embodied in the XML guideline data 402) may be provided to the prototyping/configuration tool 108. The prototyping/configuration tool 108 may include a software program embodied on a computer-readable storage medium, and may be included in the same software program as the user interface guidelines editor 104, or may be a separate software program, according to example embodiments. The prototyping/configuration tool 108 may receive code relating to the user interface, such as the XML structure 106 and/or XML guideline data 402, from the user interface guidelines editor 104. The prototyping/configuration tool 108 may receive the XML structure 106 directly from the user interface guidelines editor 104, such as in an example where the user interface guidelines editor 104 and prototyping/configuration tool 108 are included in the same software program, or may receive the XML structure via a computer storage medium, according to example embodiments.

Figure 5A:
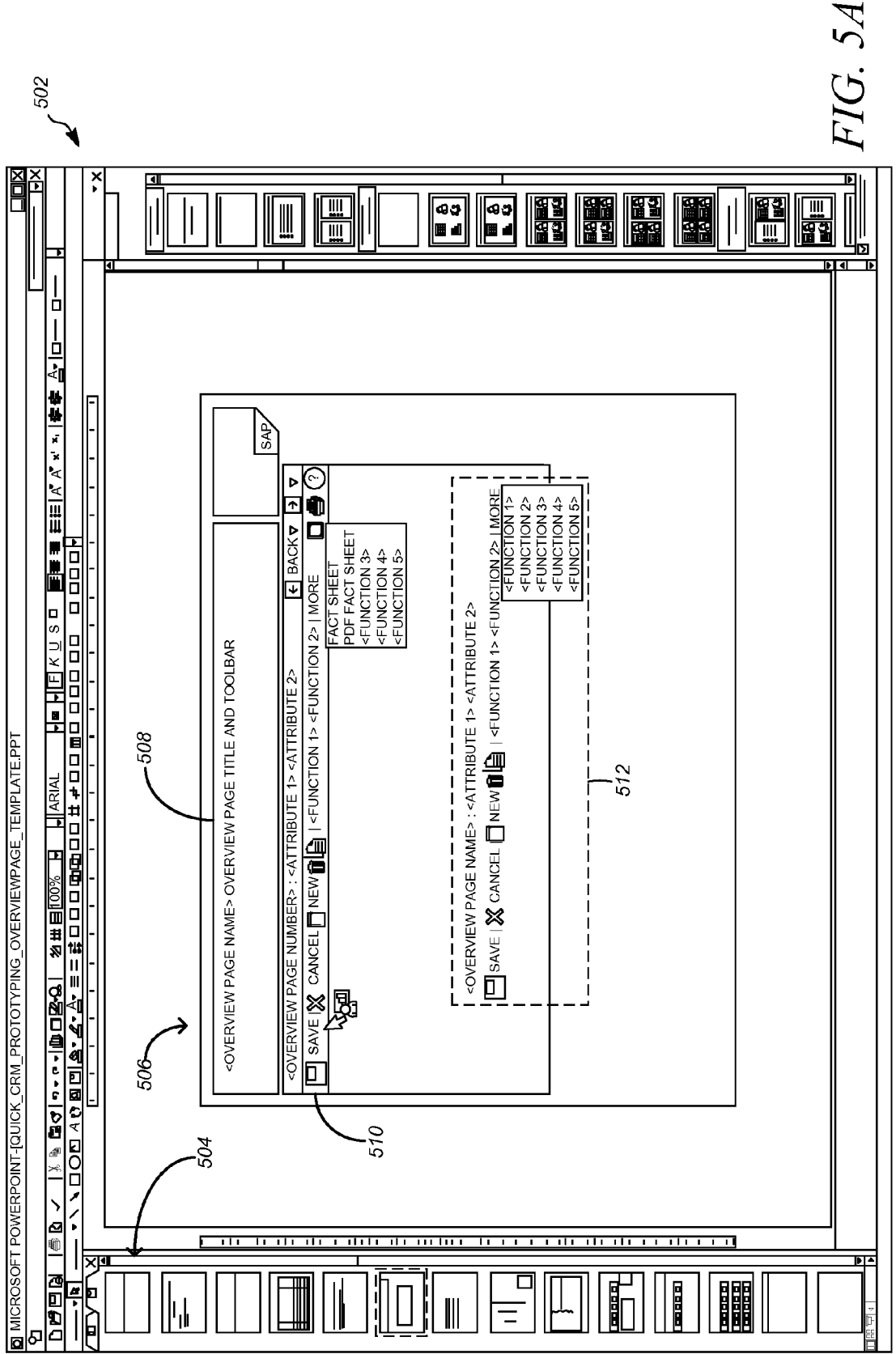
FIG. 5A is a screen shot of a prototyping graphical user interface for developing user interface elements in accordance with the guideline user interface element settings according to an example embodiment.

FIG. 5A is a screen shot of a prototyping graphical user interface 502 for developing user interface elements in accordance with the guideline user interface element settings according to an example embodiment. The prototyping graphical user interface 502 is an example of the prototyping/configuration tool 108 shown in FIG. 1. The prototyping graphical user interface 502 may, for example, present user interface element options based on the user interface guidelines 102, XML structure 106, and/or XML guideline data 402, and may receive prototype user interface element settings. In this example, a navigation bar 504 may show pages available for the solution manager to edit. A working page 506 selected by the solution manager may be displayed and available for editing. The working page 506 may include a title 508. The title 508 may include text, which may be editable by the solution manager. The working page 506 may also include a toolbar 510. The toolbar 510 may include the buttons designated as 'mandatory' by the XML guideline data 402. The prototyping graphical user interface 502 may also allow the solution manager to select any or all of the buttons designated as 'optional' by the XML guideline data 402 for inclusion in the toolbar. The toolbar 510 may, for example, be included in a user interface block 512. The user interface block 512 may be moved within the working page 506, such as by the solution manager dragging a mouse, to a desired spot on the working page 506, within the parameters prescribed by the user interface guidelines 102, XML structure 106, and/or XML guideline data 402. If a position for the user interface block 512 is mandatory, the user interface block 512 may snap back into the mandatory position. The solution manager may select any or all of the pages made available by the navigation bar 504, in any order desired, and make choices and/or modifications to the user interface within the parameters prescribed by the user interface guidelines 102, XML structure 106, and/or XML guideline data 402.

Figure 5B:
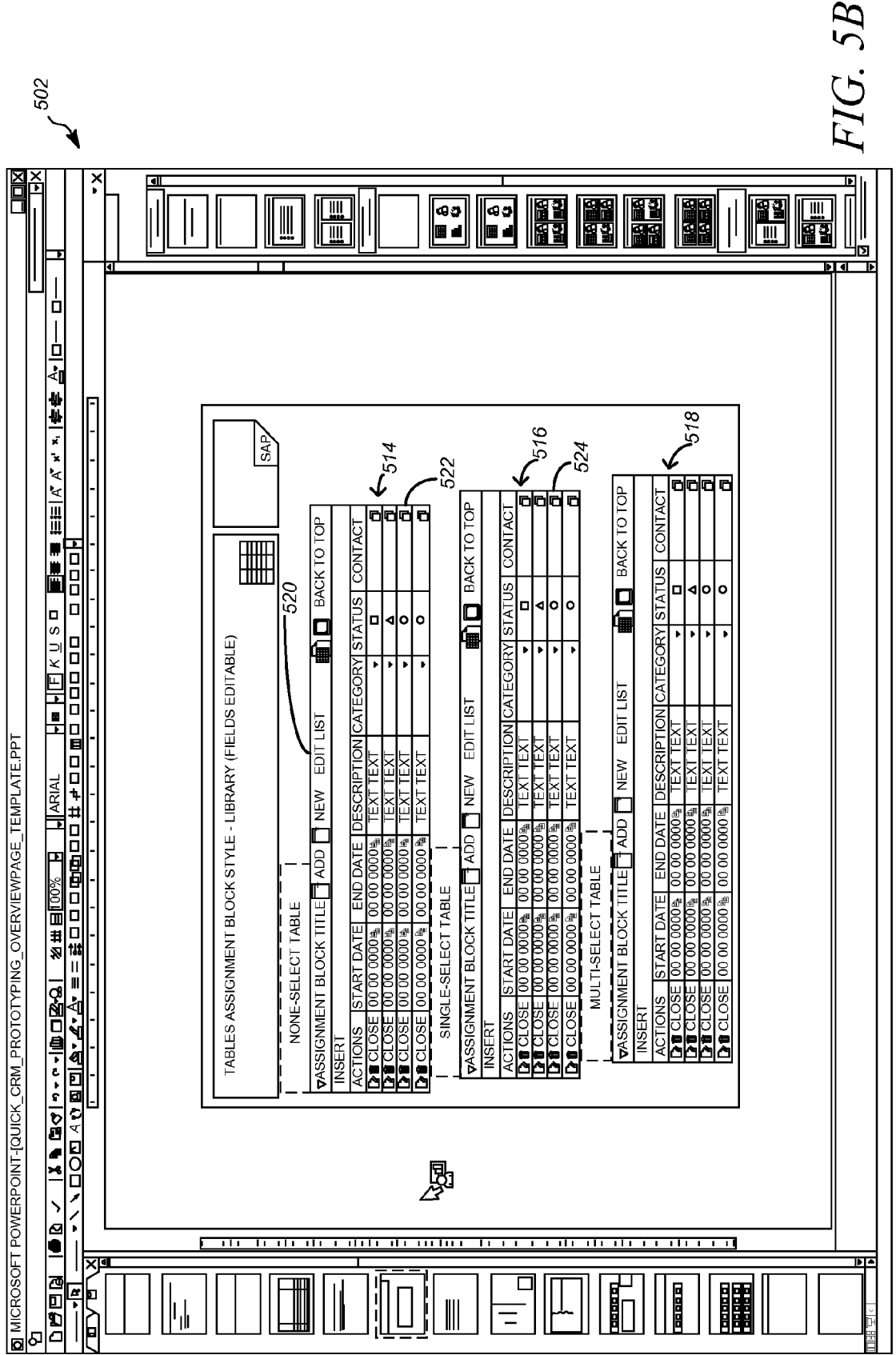
FIG. 5B is a screen shot of the prototyping graphical user interface for developing user interface elements in accordance with the guideline user interface element settings according to another example embodiment.

FIG. 5B is a screen shot of the prototyping graphical user interface 502 for developing user interface elements in accordance with the guideline user interface element settings according to another example embodiment. In this example, the prototyping graphical user interface 502 may include one or more assignment blocks 514, 516, 518, which may represent tables presented to a user. Each assignment block 514, 516, 518 may include buttons 520 allowed by the user interface guidelines 102, XML structure 106, and/or XML guideline data 402. The prototyping graphical user interface 502 may allow the solution manager to fill in the content of each of the assignment blocks 514, 516, 518, specify which columns of the assignment blocks 514, 516, 518 may be displayed to a user, and/or specify elements to be included in the tables of the assignment blocks 514, 516, 518. The prototyping graphical user interface 502 may also allow the solution manager to organize the assignment blocks in a hierarchy. For example, the prototyping graphical user interface 502 may allow the solution manager to designate the second assignment block 516 as a child of one of the rows 522 of the first assignment block 514, and may allow the solution manager to designate the third assignment block 518 as a child of one of the rows 524 of the second assignment block 516. A "child" assignment block 516, 518 may become visible to a user when the corresponding row 522, 524 has been clicked on, according to an example embodiment.

Returning to FIG. 1, the prototyping/configuration tool 108, of which the prototyping graphical user interface 502 is an example interface, may, for example, generate and/or output a user interface generator 110. The user interface generator 110 may, for example, include a file with code, such as an XML file with XML prototype data for generating a user interface based on the prototype user interface element settings inputted by the solution manager. This code may, for example, include only code relating to user interface elements, and leave for a developer to write or generate code for processes to be performed by a software application. The XML prototype data may, for example, be configured to cause a remote computer to display, to a remote user via the Internet, a user graphical user interface within a browser. The user graphical user interface may be based on the prototype user graphical user interface settings. The user interface generator 110 may still be modified for particular browsers. Thus, according to an example embodiment, the user interface generator 110, which may include an XML file for generating a user interface, may be generic to multiple browsers, such as Internet Explorer, Mozilla Firefox, and Netscape Navigator, as non-limiting examples.

The solution manager and/or developer may view mockups of the user interface as developed using the prototyping/configuration tool 108. The solution manager and/or developer may, for example, view the mockups in order to determine whether the user interface has a desired appearance.

Figure 6:
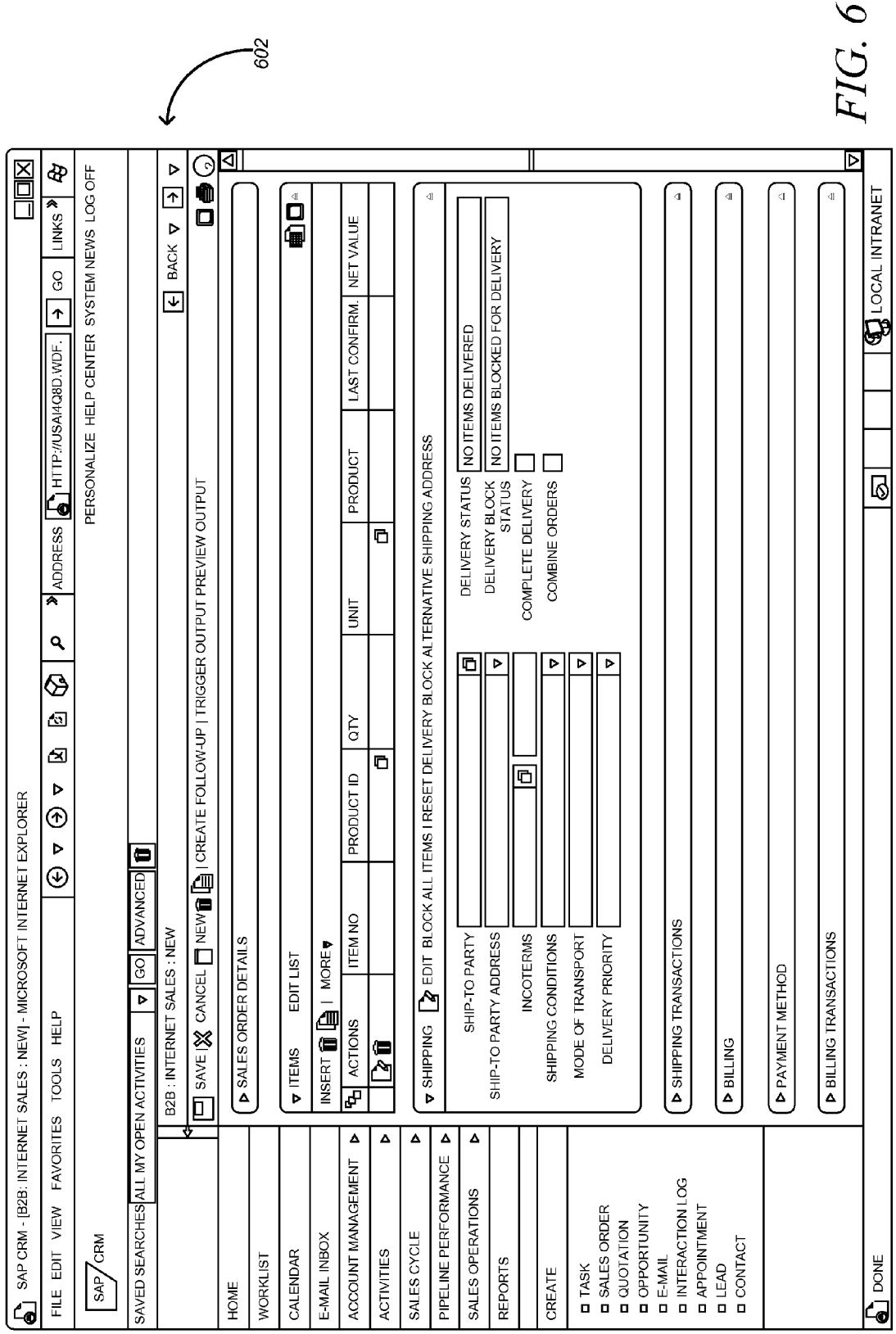
FIG. 6 is a screenshot showing an application graphical user interface with the user interface elements in accordance with the user interface guidelines according to an example embodiment.

FIG. 6 is a screenshot showing an application graphical user interface 602 with the user interface elements in accordance with the user interface guidelines 102 according to an example embodiment. The application graphical user interface 602 may, for example, be displayed based on code generated as described above.

Figure 7:
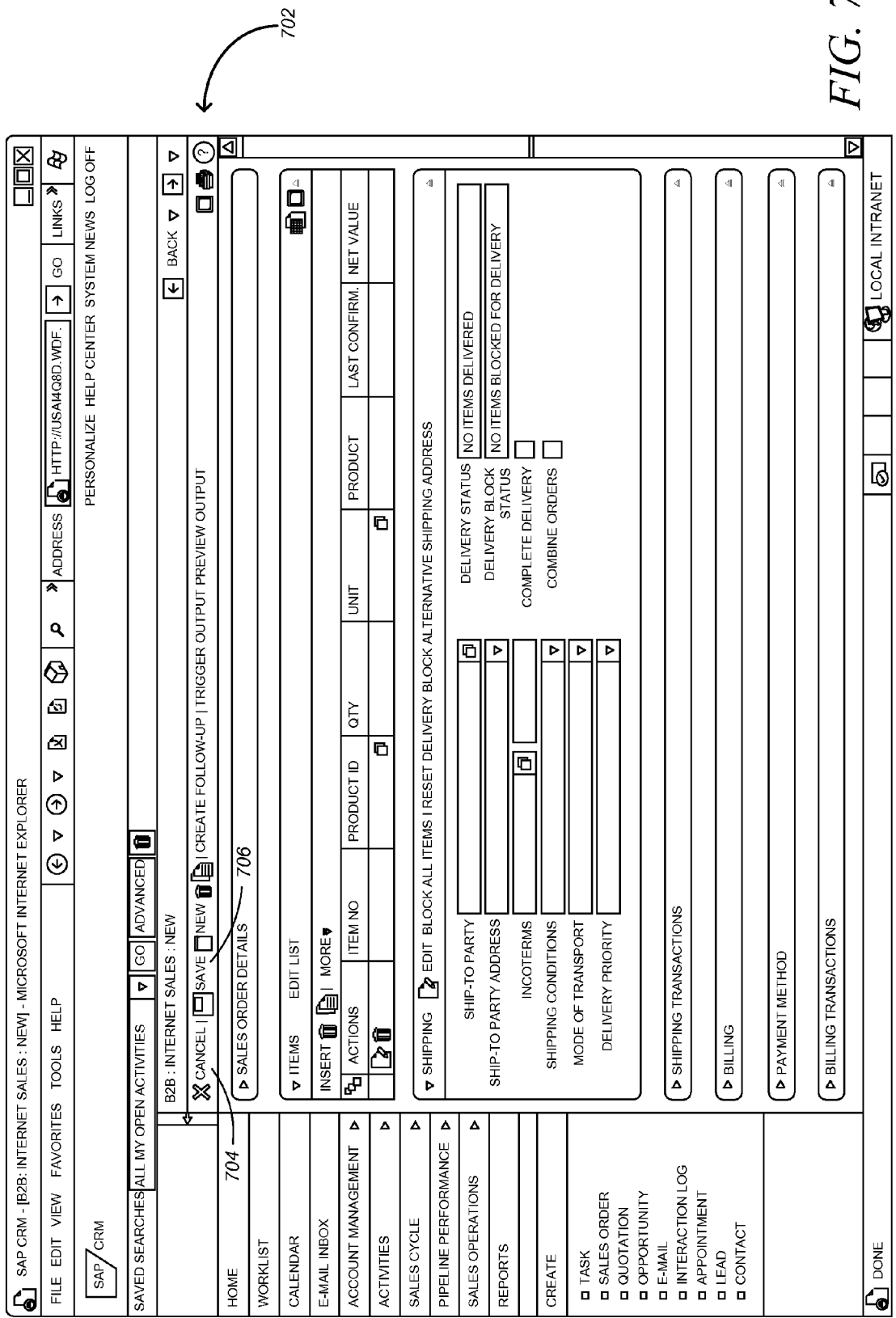
FIG. 7 is a screenshot showing an application graphical user interface with the user interface elements not in accordance with the user interface guidelines according to an example embodiment.

FIG. 7 is a screenshot showing an application graphical user interface 702 with the user interface elements not in accordance with the user interface guidelines 102 according to an example embodiment. In this example, the application graphical user interface 702 may be displayed based on code from a previous software application that was not generated as described above, or may have been generated based on an older user interface guidelines editor with different user interface guidelines. In this example, the 'Cancel' button 704 incorrectly comes before the 'Save' button 706.

The solution manager or developer may check software application code for deviations from the user interface guidelines 102 by comparing the software application code to code generated by the user interface guidelines editor 104. The solution manager or developer may, for example, use a word processing software application to compare the software application code to the code, such as the XML structure 106 and/or XML guideline data 402. The solution manager or developer may then look at the differences shown by the word processing software application to find deviations from the user interface guidelines 102.

Figure 8:
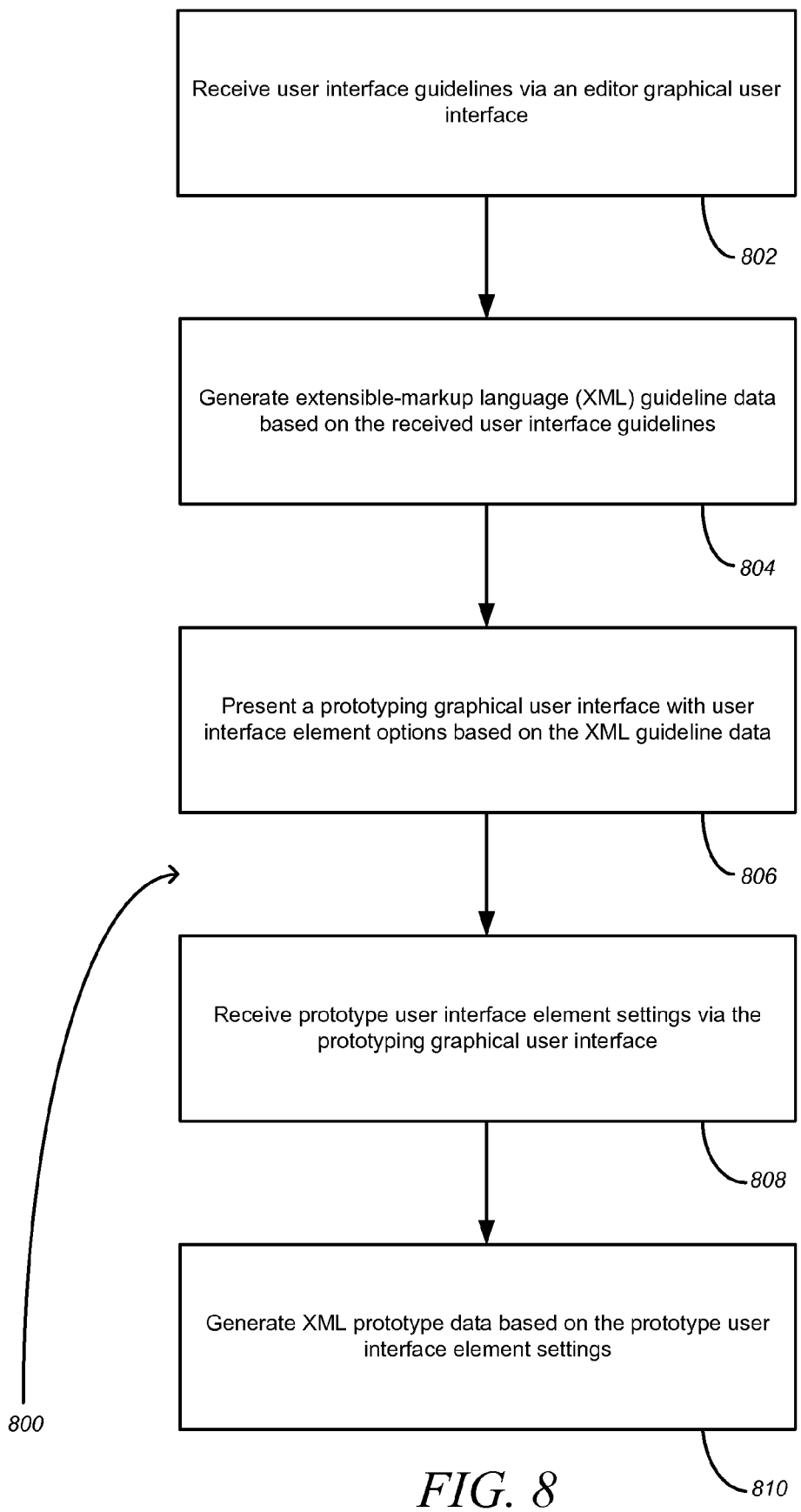
FIG. 8 is a flowchart showing a method according to an example embodiment.

FIG. 8 is a flowchart showing a method 800 according to an example embodiment. The method 800 may, for example, include receiving user interface guidelines via an editor graphical user interface (802). The method 800 may further include generating extensible-markup language (XML) guideline data based on the received user interface guidelines (804). The method 800 may further include presenting a prototyping graphical user interface with user interface element options based on the XML guideline data (806). The method 800 may further include receiving prototype user interface element settings via the prototyping graphical user interface (808). The method 800 may further include generating XML prototype data based on the prototype user interface element settings (810).

In an example embodiment, the guideline user interface element settings and the prototype user interface element settings may each include locations of buttons.

In an example embodiment, the guideline user interface element settings and the prototype user interface element settings may each include hierarchies which organize user interface elements at a plurality of levels.

In an example embodiment, the guideline user interface element settings and the prototype user interface element settings may each include user interface settings for a plurality of pages.

In an example embodiment, the guideline user interface element settings and the prototype user interface element settings may each include user interface settings for a plurality of pages including at least a home page, a work center page, a search page, an overview page, an edit page, an edit list page, and a freestyle application page.

In an example embodiment, the guideline user interface element settings and the prototype user interface element settings may each include locations of a header area, a navigation area, and a work area.

In an example embodiment, the guideline user interface element settings and the prototype user interface element settings may each include rules for entries within a navigation area.

In an example embodiment, the guideline user interface element settings and the prototype user interface element settings may each specify which columns of a table may be displayed to a user.

In an example embodiment, the guideline user interface element settings and the prototype user interface element settings may each specify elements to be included in tables.

In an example embodiment, the XML prototype data may be configured to cause a remote computer to display, to a remote user via an Internet, a user graphical user interface within a browser, a user graphical user interface based on the prototype user interface element settings.

In an example embodiment, the method 800 may further include comparing user interface element settings of a software application to the prototype user interface element settings.

Figure 9:
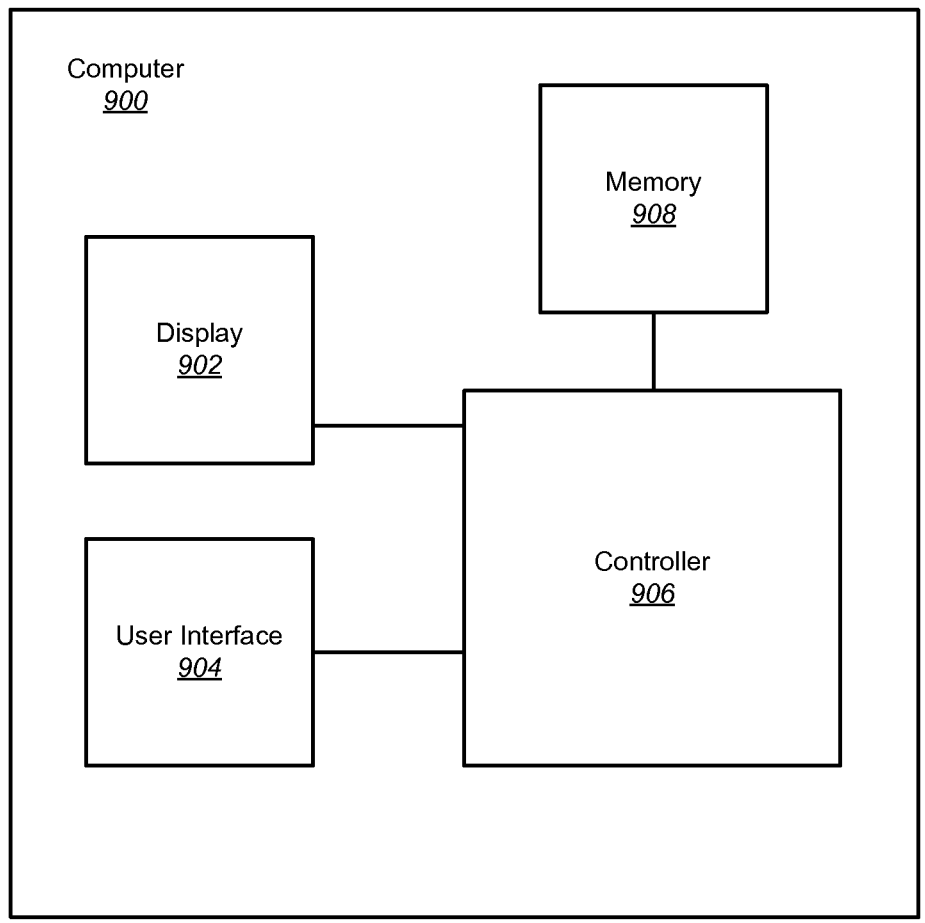
FIG. 9 shows a computer which may perform any or all of the functions described herein and shown in the preceding figures according to an example embodiment.

FIG. 9 shows a computer 900 which may perform any or all of the functions described herein and shown in the preceding figures according to an example embodiment. The computer 900 may, for example, include a display 902. The display 902 may include a monitor, and may show any or all of the data or screens described above to a solution manager, a developer, or a user. The computer 900 may also include a user interface 904. The user interface 904 may include a keyboard and/or mouse, and may receive input from the solution manager, the developer, or the user. The computer 900 may also include a controller 906. The controller 906 may include a central processing unit (CPU), and may perform any or all of the processes described above. The computer 900 may also include a memory 908. The memory may store data and/or code, and may store any of the data, user interface element settings, or code described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A computer-implemented method comprising:
receiving user interface guidelines via an editor graphical user interface, the user interface guidelines specifying mandatory user interface element settings and optional user interface element settings, the mandatory user interface element settings specifying mandatory user interface elements which must be included in a specified page and the optional user interface settings specifying user interface elements which may or may not be included in the specified page based on input received via a prototyping graphical user interface, wherein the specified page includes a header area, a navigation area, and a work area;
generating the prototyping graphical user interface, the prototyping graphical user interface including the mandatory user interface element settings and presenting user interface element options for the optional user interface element settings, based on the user interface guidelines received via the editor graphical user interface;
receiving prototype user interface element settings for the optional user interface element settings via the prototyping graphical user interface; and
generating a user interface based on the mandatory user interface element settings and the received prototype user interface element settings for the optional user interface element settings, the user interface including the specified page which displays the mandatory user interface elements and the included optional user interface elements and being configured to receive input from a user via the mandatory user interface elements and the included optional user interface elements,
wherein the work area includes at least:
a main properties table to set rules for one or more properties of the specified page, the one or more properties comprising visibility, dynamic behavior, or display sub-elements; and
a children properties table to set rules for buttons located in the header area and dividers between the buttons.

2. The method of claim 1, wherein the mandatory user interface element settings and the optional user interface element settings elements each include locations of buttons.

3. The method of claim 1, wherein the mandatory user interface element settings and the optional user interface element settings each include hierarchies which organize user interface elements at a plurality of levels.

4. The method of claim 1, wherein the mandatory user interface element settings and the optional user interface element settings each include user interface settings for a plurality of pages.

5. The method of claim 1, wherein the mandatory user interface element settings and the optional user interface element settings each include user interface settings for a plurality of pages including at least a home page, a work center page, a search page, an overview page, an edit page, an edit list page, and a freestyle application page.

6. The method of claim 1, wherein the mandatory user interface element settings and the optional user interface element settings each include locations of the header area, the navigation area, and the work area.

7. The method of claim 1, wherein the mandatory user interface element settings and the optional user interface element settings each include rules for entries within the navigation area.

8. The method of claim 1, wherein the mandatory user interface element settings and the optional user interface element settings each specify which columns of a table may be displayed to a user.

9. The method of claim 1, wherein the mandatory user interface element settings and the optional user interface element settings each specify elements to be included in tables.

10. The method of claim 1, wherein the generating the user interface includes causing a remote computer to display, to a remote user via an Internet, the user interface within a browser, the user interface being based on the received prototype user interface element settings.

11. The method of claim 1, further comprising determining whether software application code deviates from the user interface guidelines by comparing the software application code to the received user interface guidelines.

12. A computer program product for generating a user interface, the computer program product being tangibly embodied on a non-transitory computer storage medium and including executable code that, when executed, is configured to cause a computer to:
receive user interface guidelines via an editor graphical user interface, the user interface guidelines specifying mandatory user interface element settings and optional user interface settings, the mandatory user interface element settings specifying mandatory user interface elements which must be included in a specified page and the optional user interface settings specifying user interface elements which may or may not be included in the specified page based on input received via a prototyping graphical user interface, wherein the specified page includes a header area, a navigation area, and a work area;
generate the prototyping graphical user interface, the prototyping graphical user interface including the mandatory user interface element settings and presenting user interface element options for the optional user interface element settings, based on the user interface guidelines received via the editor graphical user interface;
receive prototype user interface element settings for the optional user interface element settings via the prototyping graphical user interface; and
generate the user interface based on the mandatory user interface element settings and the received prototype user interface element settings for the optional user interface element settings, the user interface including the specified page which displays the mandatory user interface elements and the included optional user interface elements and is configured to receive input from a user via the mandatory user interface elements and the included optional user interface elements,
wherein the work area includes at least:
a main properties table to set rules for one or more properties of the specified page, the one or more properties comprising visibility, dynamic behavior, or display sub-elements; and a children properties table to set rules for buttons located in the header area and dividers between the buttons.

13. The computer program product of claim 12, wherein the mandatory user interface element settings and the optional user interface element settings each include locations of the header area, the navigation area, and the work area.

14. The computer program product of claim 12, wherein the mandatory user interface element settings and the optional user interface element settings each include rules for entries within the navigation area.

15. The computer program product of claim 12, wherein the mandatory user interface element settings and the optional user interface element settings each specify which columns of a table may be displayed to the user.

16. The computer program product of claim 12, wherein the mandatory user interface element settings and the optional user interface element settings each specify elements to be included in tables.

17. The computer program product of claim 12, wherein the generating the user interface includes causing a remote computer to display, to a remote user via an Internet, the user interface within a browser, the user interface being based on the prototype user interface element settings.

18. The computer program product of claim 12, further configured to cause the computer to determine whether software application code deviates from the user interface guidelines by comparing the software application code to the received user interface guidelines.

19. The computer-implemented method of claim 1, further comprising:
   receiving a change of a position for a mandatory user interface element via the prototyping graphical user interface; and
   snapping the mandatory user interface element into the mandatory position.

20. The computer program product of claim 12, further configured to cause the computer to:
   receive a change of a position for a mandatory user interface element via the prototyping graphical user interface; and
   snap the mandatory user interface element into the mandatory position.

21. The computer-implemented method of claim 1, wherein the generating the user interface includes generating a software application including the user interface, the software application being configured to perform actions in response to input received from the user via the user interface.

22. The computer program product of claim 12, wherein the generating the user interface includes generating a software application including the user interface, the software application being configured to perform actions in response to input received from the user via the user interface.

* * * * *